United States Patent [19]
Mayr

[11] Patent Number: 6,109,616
[45] Date of Patent: Aug. 29, 2000

[54] BRUSH SEAL WITH A CORE RING WRAPPED BY BRISTLE BUNDLES

[75] Inventor: Alfred Mayr, Roehrmoos, Germany

[73] Assignee: MTU Motoren- und Turbinen-Union Muenchen GmbH, Germany

[21] Appl. No.: 08/973,205

[22] PCT Filed: Mar. 20, 1997

[86] PCT No.: PCT/EP97/01399

§ 371 Date: Dec. 4, 1997

§ 102(e) Date: Dec. 4, 1997

[87] PCT Pub. No.: WO97/38247

PCT Pub. Date: Oct. 16, 1997

[30] Foreign Application Priority Data

Apr. 4, 1996 [DE] Germany .................. 196 13 510

[51] Int. Cl.[7] ............... F16J 15/447; B23P 15/00
[52] U.S. Cl. ..................... 277/355; 29/888.3
[58] Field of Search .................. 277/355; 29/888.3, 29/598, 414, 415

[56] References Cited

U.S. PATENT DOCUMENTS

| | | |
|---|---|---|
| 4,227,745 | 10/1980 | Enchelmaier . |
| 5,066,024 | 11/1991 | Reisinger et al. ............. 277/355 |
| 5,110,033 | 5/1992 | Noone et al. . |
| 5,183,197 | 2/1993 | Howe ............. 228/160 |
| 5,316,318 | 5/1994 | Veau ............. 277/355 |
| 5,597,167 | 1/1997 | Snyder et al. ............. 277/355 |
| 5,732,466 | 3/1998 | Bouchard ............. 29/888.3 |
| 5,794,938 | 8/1998 | Hofner et al. ............. 277/355 |
| 5,799,952 | 9/1998 | Morrison et al. ............. 277/355 |

FOREIGN PATENT DOCUMENTS

| | | |
|---|---|---|
| 0 192 477 A2 | of 1986 | European Pat. Off. . |
| 0 211 275 A2 | of 1986 | European Pat. Off. . |
| 2 650 048 | of 1989 | France . |
| 39 07 614 A1 | of 1990 | Germany . |

*Primary Examiner*—Anthony Knight
*Assistant Examiner*—Alison K. Pickard
*Attorney, Agent, or Firm*—Evenson, McKeown, Edwards & Lenahan, P.L.L.C.

[57] ABSTRACT

A brush for sealing a gap between a rotor/stator system comprises a rotor-concentric clamping ring whose interior chamber receives bristle bundles that project into gap. The bundles are wrapped around core ring that extends into the interior of clamping ring. The core ring has separating disks that are spaced apart from one another in the circumferential direction by an angular pitch α, and by winding ribs that are wrapped by the bundles. The winding ribs connect adjacent separating disks in such fashion that as a result of the diagonal positioning of separating disks in the circumferential direction, bundles are aligned at an angle β to radius R. This makes it possible to hold bristle bundles securely with a predetermined angular orientation.

12 Claims, 2 Drawing Sheets

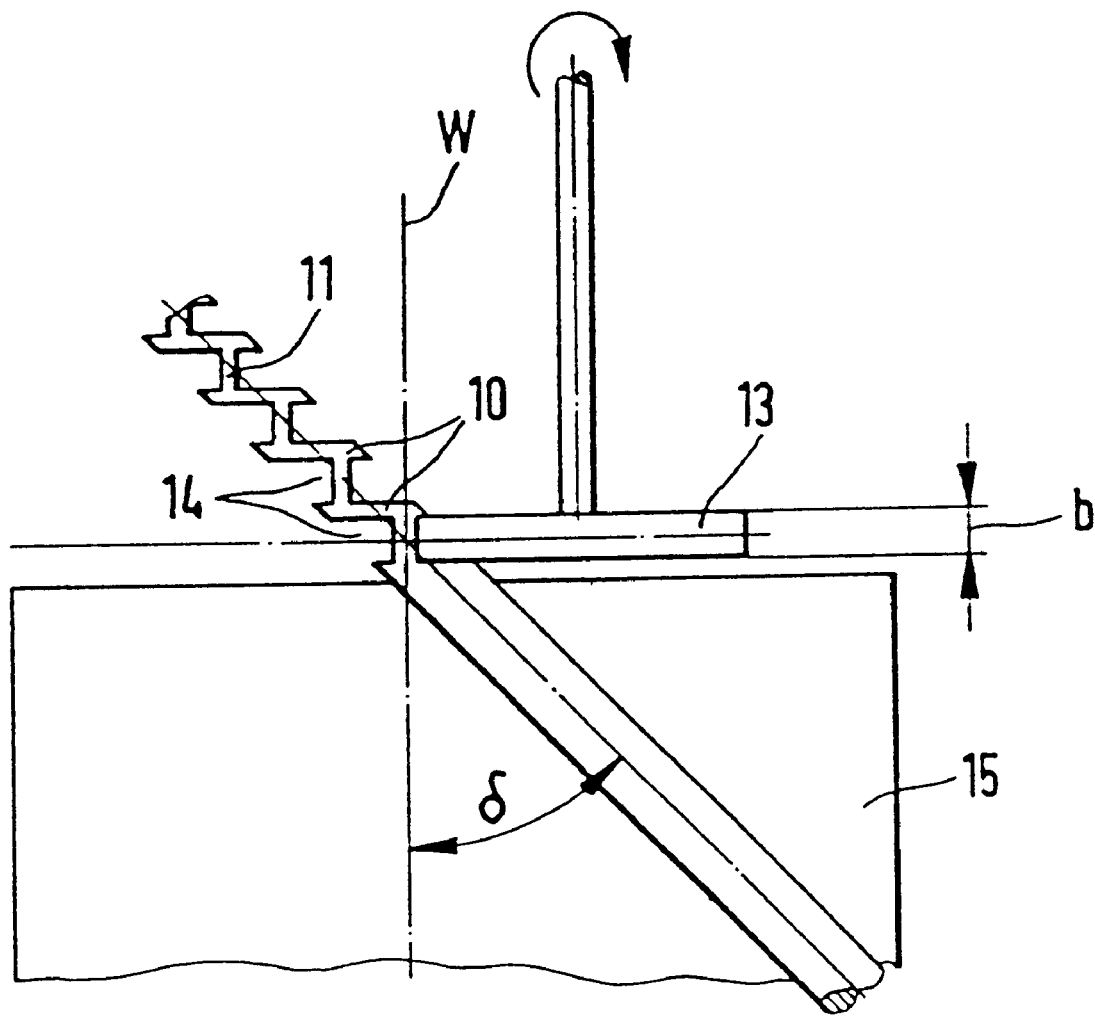

BRUSH SEAL WITH A CORE RING WRAPPED BY BRISTLE BUNDLES

BACKGROUND AND SUMMARY OF THE INVENTION

The invention relates to a brush seal for sealing an annular gap between a rotor/stator arrangement, and to a method for manufacturing such a brush seal.

The brush seals are mounted in a stator housing surrounding a rotor concentrically, with the bristles fitting together closely and being arranged at an angle to the radius. The ends of the bristles touch the rotor at its circumference, or end shortly before, so that they provide a seal between chambers which are subjected to different pressures on both sides of the seal under all operating conditions. Because of their elasticity and their angular position relative to the rotors, the bristles can bend to compensate for eccentricities of the rotor and/or shaft and for rotor imbalance.

A brush seal of the generic type is disclosed in German patent document DE-OS 39 07 614. However, because the bristles are wrapped around a rotor-concentric clamping ring and surrounded by a C-shaped clamping ring, diagonal alignment of the bristles relative to the rotor is not possible, especially at larger angles, and the bristles cannot maintain a given diagonal angular pitch during operation. In addition, stronger clamping of the bristles, especially in the case of ceramic fibers, is not possible since high pressure at the edge causes premature wear or breakage of the bristles. This is especially true with regard to the desirable use of very fine and/or extremely thin bristles.

The object of the invention, therefore, is to provide a brush seal that permits diagonal positioning of the bristles relative to the rotor and ensures the functional reliability of the brush seal while maintaining the angular pitch of the bristles over the entire operating range. A method is also provided for simple manufacture of the core ring of such a brush seal.

These and other objects and advantages are achieved according to the invention by using a plurality of separating disks spaced apart from one another at an angular pitch $\alpha$, so that a uniform diagonal angular pitch is assumed over the entire circumference of the brush seals. The bristle bundles thus aligned by the separating disks each surround a winding rib which is located between the separating disks and also connects adjacent separating disks with one another. Together with the clamping force exerted by the clamping ring, it is possible to secure the bristle bundle reliably at the predetermined angular orientation.

One advantage of the invention is that by using separating disks mounted at an angle in the interior of the clamping ring, the bristle bundles are forcibly aligned at an angle $\beta$ relative to the circumference of the rotor without extreme clamping force being required to hold the bristle bundles.

Another advantage of the invention is that by using a straight blank (for example a wire) the core ring, consisting of separating disks and winding ribs arranged alternately, can be manufactured in an economical fashion by sawing or milling. When a disk milling cutter is used, whose disk thickness corresponds to the distance between two adjacent separating disks, it cuts circumferential grooves in the wire as it makes a pass in a circular movement around the wire so that a winding rib of the desired diameter remains between two adjacent separating disks. The position of the axis of the disk milling cutter relative to the lengthwise axis of the wire, at an angle that corresponds to the angular pitch of the separating disks relative to the radius, permits a diagonal orientation of the separating disks relative to the axis of the core ring as well as an elliptical shape of the separating disks.

After each pass, the wire is advanced by the constant distance between the separating disks in the clamp, so that the separating disks together with the winding ribs are gradually cut from the wire. When the wire has been machined over its entire length, it is bent into a core ring and joined. The finished core ring can then be provided with the bristles and placed in the clamping ring. Final machining to produce a brush seal then follows.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic view of a clamping device with wire for the manufacture of a core ring.

DETAILED DESCRIPTION OF DRAWINGS

Figure 1:
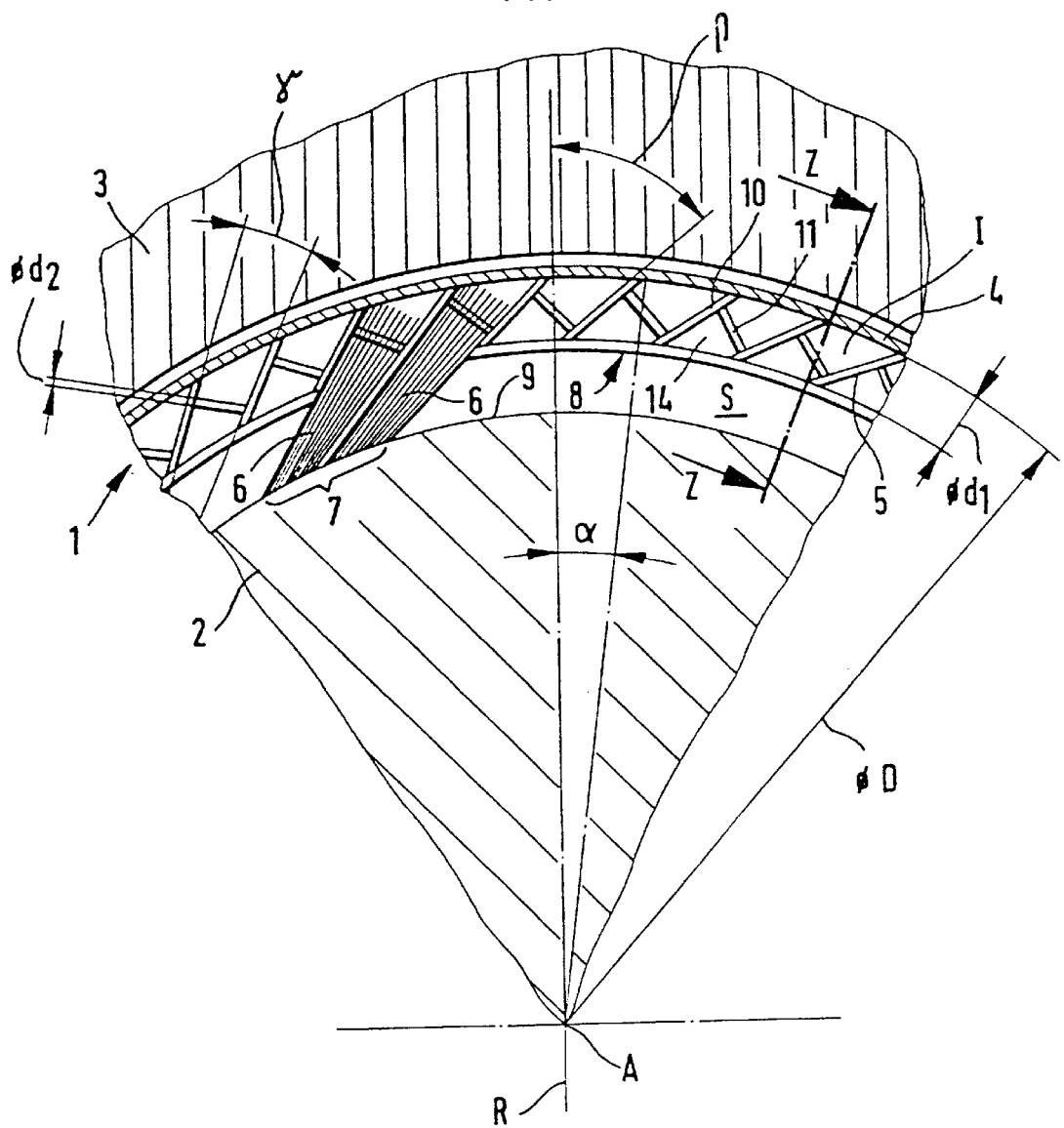
FIG. 1 is a partial sectional view of a rotor/stator arrangement in which two bristle bundles are shown as an example in an angular position.

FIG. 1 shows a brush seal 1 for a turbo machine (not shown in greater detail). The seal is formed concentrically between a rotor 2 and a stator 3, and serves to provide a seal between two chambers subjected to different pressures. To receive the numerous bristle bundles 6, brush seal 1 has a clamping ring 4 with a toroidal interior chamber I as well as a core ring 5 that is likewise concentric with respect to the rotor, and is located inside clamping ring 4.

Figure 2:
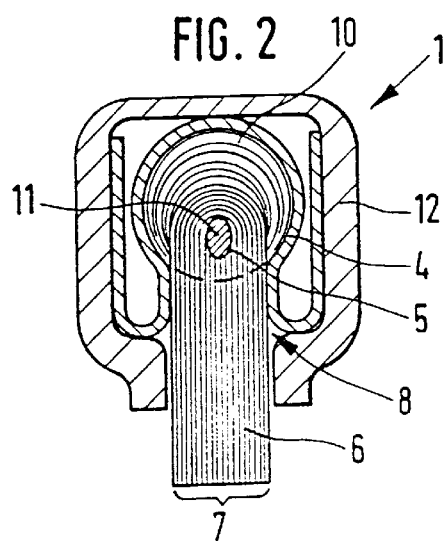
FIG. 2 is a cross section through a brush seal taken along line z—z in FIG. 1.

As is also shown in FIG. 2, the free ends 7 of bristle bundles 6 project out of a circumferential slot 8 that opens radially inward from clamping ring 4. The free ends 7 abut a sealing surface 9 that surrounds rotor 2, thus sealing gap S between rotor 2 and stator 3.

As can also be seen from FIG. 1, bristle bundles 6 are mounted diagonally at an angle $\beta$ of 45° relative to a radius R. The ends thus abutting sealing surface 9 at an angle produce an improved sealing effect for the entire system by contrast with bristles that are aligned exactly radially.

As can also be seen from FIG. 2, bristle bundles 6, which may be made, for example, of a silicon carbide material, are held by core ring 5 and surrounded by clamping ring 4. For this purpose, the core ring 5 is composed of alternately arranged elliptical separating disks 10 and winding ribs 11 in the shape of a circular cylinder. The separating disks 10 are spaced apart from one another at an angular pitch $\alpha$ of 10° or less, and aligned relative to one another at an angle $\gamma$, (FIG. 1), and for alignment of bristle bundles 6, are mounted diagonally at the angle $\beta=45°$ to rotor axis A, so that they hold bristle bundles 6 in the desired alignment. Winding ribs 11 that join adjacent separating disks 10 to one another are mounted diagonally at a 45° angle relative to the tangential alignment so they can be wrapped by a bristle bundle 6. As a result of all the bristles forming a loop around a winding rib 11, assurance is provided that all the bristles are equally protected against pulling out of clamping ring 4.

Brush seal 1 shown in FIG. 2 has a welded sealing housing 12 which surrounds clamping ring 4 and opens radially inward to accept bristle bundle 6 in a circumferential slot 8'. A brush seal 1 housed in this fashion can then be used in a rotor/stator arrangement.

FIG. 3 shows a work step for manufacture the core ring 5 with its N or "H"-shaped angular sections by means of a disk milling cutter 13. A straight wire 4 mm in diameter is used as the blank for core ring 5 and is clamped in a clamping device 15 at an angle δ=45° to a work plane for milling circumferential grooves 14. This clamping angle δ results from the desired angle β of the bristle bundle and separating disks 10. A disk milling cutter 13 (whose disk thickness b matches circumferential groove 14 or the space between adjacent separating disks 10) gradually cuts circumferential grooves 14 into the wire. For this purpose, disk milling cutter 13 performs a circular movement around an axis that is identical to the axis of symmetry W of the angle rib 11 to be cut out.

One circuit of disk milling cutter 13 around axis of symmetry W cuts the diagonal circumferential groove 14, and a cylindrical winding rib 11 remains.

The wire is then pushed outward from clamping device 15 for a distance that corresponds to the arcuate spacing of separating disks 10, and the wire is clamped again to cut the next circumferential groove.

This workstep is repeated as frequently as necessary until the desired length of the wire is provided with circumferential grooves 14. Then the wire is bent into a core ring 5 and the ends are joined together.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Brush seal for sealing an annular gap between a rotor/stator arrangement, having a rotor-concentric clamping ring with a toroidal interior chamber that receives bristle bundles whose ends project out of a circumferential slot of the clamping ring toward the gap, such bundles being wrapped around a core ring that extends in the interior chamber, wherein:
   the core ring comprises separating disks that are spaced apart in the circumferential direction by an angular pitch α, and winding ribs that are wrapped by bundles;
   the winding ribs and separating disks are arranged in alternating sequence; and
   the separating disks are disposed diagonally in the circumferential direction, whereby the bundles are aligned at an angle to a radius of the rotor.

2. Brush seal according to claim 1 wherein an angle between adjacent separating disks corresponds to the angular pitch α.

3. Brush seal according to claim 1 wherein the separating disks have a matching outside diameter to receive the clamping ring in a toroidal interior chamber.

4. Brush seal according to claim 2 wherein the separating disks have a matching outside diameter to receive the clamping ring in a toroidal interior chamber.

5. Brush seal according to claim 1 wherein the separating disks are elliptical.

6. Brush seal according to claim 1 wherein the winding ribs have a circular cylindrical cross section.

7. Brush seal according to claim 1 wherein the angular pitch α is less than or equal to 10°.

8. Brush seal according to claim 1, wherein the bristles comprise a silicon carbide material.

9. Brush seal according to claim 1, wherein adjacent separating disks and winding ribs form H- or N-shaped angle sections of core ring (5) in the circumferential direction.

10. A method of manufacturing a core ring for a brush seal in a rotor/stator arrangement having a core ring disposed in a circumferentially extending clamping ring, said core ring comprising a plurality of separating disks which are aligned at a predetermined angle relative to a radius of said rotor/stator arrangement, are connected by a plurality of winding ribs and are spaced apart in circumferential direction by a predetermined angular pitch, said method comprising:
   providing a wire with a diameter that corresponds to a diameter of an interior chamber of the clamping ring, at least along a circumferential length of the interior chamber;
   a clamping the wire;
   relative cutting circumferential grooves in the wire at an angle relative to a lengthwise axis of the wire which angle is approximately equal to the predetermined angle, said grooves being spaced apart from one another along said lengthwise axis at a separation which corresponds to said predetermined angular pitch; and
   bending and connecting ends of the wire to form a core ring.

11. A brush seal for sealing a circumferentially extending gap in a rotor/stator arrangement, said brush seal comprising:
   a rotor concentric clamping ring having a circumferentially extending interior chamber;
   a core ring arranged in said interior chamber and having a cross sectional shape and diameter that correspond to a cross sectional shape and diameter of said interior chamber; and
   a plurality of radially inwardly extending bristle bundles connected on said core ring; wherein
      the core ring comprises a plurality of separating disks which are aligned diagonally at a predetermined first angle relative to a radius of said rotor/stator arrangement, are connected by a plurality of winding ribs and are spaced apart in a circumferential direction by a fixed angular pitch; and
      said bristle bundles are wrapped on said core ring and separated by said separating disks, whereby said bristle bundles extend radially diagonally inward at an angle relative to said radius of said rotor/stator arrangement, which angle corresponds to said first angle.

12. The brush seal according to claim 11 wherein said cross sectional shape of said interior chamber of said clamping ring is substantially circular, and said diagonally aligned separating disks are substantially elliptical shaped.

\* \* \* \* \*